United States Patent
Gey et al.

(10) Patent No.: US 9,505,064 B2
(45) Date of Patent: Nov. 29, 2016

(54) CUTTING TOOL HAVING AT LEAST PARTIALLY MOLDED BODY AND METHOD OF MAKING SAME

(75) Inventors: Christoph Gey, Zirndorf (DE); John Barry, Ennis (IE); Joseph Connolly, Pleasantville, NY (US); Francois Gau, Export, PA (US); Thilo Mueller, Erlangen (DE)

(73) Assignee: KENNAMETAL INC., Latrobe, PA (US)

( * ) Notice: Subject to any disclaimer, the term of this patent is extended or adjusted under 35 U.S.C. 154(b) by 484 days.

(21) Appl. No.: 13/297,767

(22) Filed: Nov. 16, 2011

(65) Prior Publication Data

US 2013/0121777 A1   May 16, 2013

(51) Int. Cl.
  *B21K 21/00*   (2006.01)
  *B21K 5/04*   (2006.01)
  (Continued)

(52) U.S. Cl.
  CPC ............ *B23B 51/048* (2013.01); *B23C 5/109* (2013.01); *B23C 5/20* (2013.01); *B23D 77/02* (2013.01); *B23P 15/28* (2013.01); *B29C 45/0001* (2013.01); *B29C 45/0005* (2013.01);
  (Continued)

(58) Field of Classification Search
  CPC ............ B23B 51/048; B23B 2226/27; B29C 45/14467; B29C 45/0005; B29C 45/0001; B23D 77/02; B23C 5/20; B23C 5/109; B23P 15/28; Y10T 407/26; Y10T 407/27; Y10T 407/24; Y10T 407/19; B29K 2995/0087; B23C 2226/27

USPC ....... 76/108.1, 101.1, 115; 407/30, 115, 118, 407/119; 264/259, 261, 279, 328.1; 164/98, 164/112, 137
See application file for complete search history.

(56) References Cited

U.S. PATENT DOCUMENTS

| 3,386,812 A | 6/1968 | Sheinberg |
| 3,590,472 A | 7/1971 | Nix et al. |

(Continued)

FOREIGN PATENT DOCUMENTS

| CN | 1213993 A | 4/1999 |
| CN | 1280896 A | 1/2001 |

(Continued)

OTHER PUBLICATIONS

Dec. 12, 2013—Translation_of_Notice.
(Continued)

*Primary Examiner* — Ghassem Alie
*Assistant Examiner* — Bharat C Patel
(74) *Attorney, Agent, or Firm* — Ian K. Samways

(57) ABSTRACT

A cutting tool for performing cutting operations on a workpiece. The cutting tool includes a generally cylindrical body disposed about a central axis. The generally cylindrical body includes a first end and an opposite second end. The cutting tool further includes a cutting portion and a mounting portion. The cutting portion is disposed at or about the first end of the generally cylindrical body and includes a number of cutting edges structured to engage the workpiece during cutting operations. The mounting portion is disposed at or about the opposite second end of the generally cylindrical body and is structured to be coupled to the machine tool. At least a portion of the generally cylindrical body comprises a molded portion formed via a molding process about the cutting portion in a manner that couples the cutting portion to the generally cylindrical body.

16 Claims, 3 Drawing Sheets

(51) Int. Cl.

| | |
|---|---|
| *B23B 51/04* | (2006.01) |
| *B23P 15/28* | (2006.01) |
| *B23C 5/10* | (2006.01) |
| *B23C 5/20* | (2006.01) |
| *B23D 77/02* | (2006.01) |
| *B29C 45/14* | (2006.01) |
| *B29C 45/00* | (2006.01) |

(52) U.S. Cl.
CPC .... *B29C 45/14467* (2013.01); *B23B 2226/27* (2013.01); *B23C 2226/27* (2013.01); *B29K 2995/0087* (2013.01); *Y10T 407/19* (2015.01); *Y10T 407/24* (2015.01); *Y10T 407/26* (2015.01); *Y10T 407/27* (2015.01)

(56) References Cited

U.S. PATENT DOCUMENTS

| | | | | |
|---|---|---|---|---|
| 3,902,864 | A * | 9/1975 | Nix et al. | 428/583 |
| 4,282,176 | A * | 8/1981 | Farrell | B29C 45/82 264/328.13 |
| 4,337,677 | A * | 7/1982 | Rauckhorst et al. | 76/108.2 |
| 4,423,646 | A * | 1/1984 | Bernhardt | 76/108.1 |
| 4,713,286 | A * | 12/1987 | Bunting et al. | 428/323 |
| 4,779,440 | A * | 10/1988 | Cleve et al. | 72/260 |
| 4,872,500 | A * | 10/1989 | Duffey et al. | 164/34 |
| 4,907,665 | A * | 3/1990 | Kar | E21B 10/52 175/426 |
| 5,007,493 | A * | 4/1991 | Coolidge | E21B 10/55 175/432 |
| 5,033,560 | A * | 7/1991 | Sawyer | E21B 10/602 175/415 |
| 5,065,647 | A * | 11/1991 | Johnson | 76/108.6 |
| 5,195,404 | A * | 3/1993 | Notter et al. | 76/108.6 |
| 5,272,940 | A * | 12/1993 | Diskin | 76/108.6 |
| 5,358,026 | A * | 10/1994 | Simpson | 164/98 |
| 5,373,907 | A * | 12/1994 | Weaver | 175/426 |
| 5,611,251 | A * | 3/1997 | Katayama | 76/108.6 |
| 5,829,539 | A * | 11/1998 | Newton | E21B 10/52 175/393 |
| 5,868,885 | A * | 2/1999 | Crockett et al. | 156/89.27 |
| 6,029,544 | A * | 2/2000 | Katayama | 76/108.6 |
| 6,058,807 | A * | 5/2000 | Fujii et al. | 76/108.6 |
| 6,132,148 | A | 10/2000 | Thompson | |
| 6,145,606 | A * | 11/2000 | Haga | 175/420.1 |
| 6,148,936 | A * | 11/2000 | Evans | E21B 10/46 175/374 |
| 6,238,151 | B1 * | 5/2001 | Takagi | 408/230 |
| 6,287,360 | B1 * | 9/2001 | Kembaiyan | B22F 7/06 175/374 |
| 6,402,439 | B1 * | 6/2002 | Puide et al. | 408/144 |
| 6,450,739 | B1 * | 9/2002 | Puide et al. | 408/144 |
| 6,468,679 | B1 * | 10/2002 | Zhang et al. | 428/697 |
| 6,929,434 | B2 | 8/2005 | Prokop | |
| 7,201,543 | B2 * | 4/2007 | Muhlfriedel et al. | 408/230 |
| 7,340,978 | B2 * | 3/2008 | Kugelberg et al. | 76/108.6 |
| 7,513,319 | B2 * | 4/2009 | DeVall | 175/392 |
| 7,533,739 | B2 * | 5/2009 | Cooley et al. | 175/432 |
| 7,575,401 | B1 * | 8/2009 | Garrick et al. | 408/145 |
| 7,736,582 | B2 * | 6/2010 | Toth | 264/642 |
| 8,109,177 | B2 * | 2/2012 | Kembaiyan | 76/108.1 |
| 8,318,063 | B2 * | 11/2012 | Mirchandani et al. | 264/125 |
| 8,678,072 | B2 * | 3/2014 | Shavit | 164/113 |
| 2003/0118413 | A1 * | 6/2003 | Bruhn et al. | 408/144 |
| 2004/0245022 | A1 * | 12/2004 | Izaguirre | B22F 7/06 175/374 |
| 2007/0081870 | A1 * | 4/2007 | Muhlfriedel et al. | 408/230 |
| 2008/0156148 | A1 * | 7/2008 | Smith et al. | 76/102 |
| 2008/0247899 | A1 * | 10/2008 | Cho et al. | 419/10 |
| 2009/0116913 | A1 * | 5/2009 | Xiao et al. | 408/1 R |
| 2010/0098505 | A1 * | 4/2010 | Garrick et al. | 407/113 |
| 2011/0081215 | A1 * | 4/2011 | Nakamura et al. | 408/230 |
| 2011/0097976 | A1 * | 4/2011 | Muhlfriedel et al. | 451/48 |
| 2011/0154954 | A1 * | 6/2011 | Singh et al. | 76/108.6 |

FOREIGN PATENT DOCUMENTS

| | | |
|---|---|---|
| CN | 1379704 A | 11/2002 |
| CN | 1156352 C | 7/2004 |
| CN | 1997475 A | 7/2007 |
| EP | 1066901 A2 | 1/2001 |
| WO | 2008124456 A2 | 10/2008 |

OTHER PUBLICATIONS

First Office Action for Chinese Application No. 201210461423.4 issued Feb. 1, 2016 and English Translation, 17 pages.

* cited by examiner

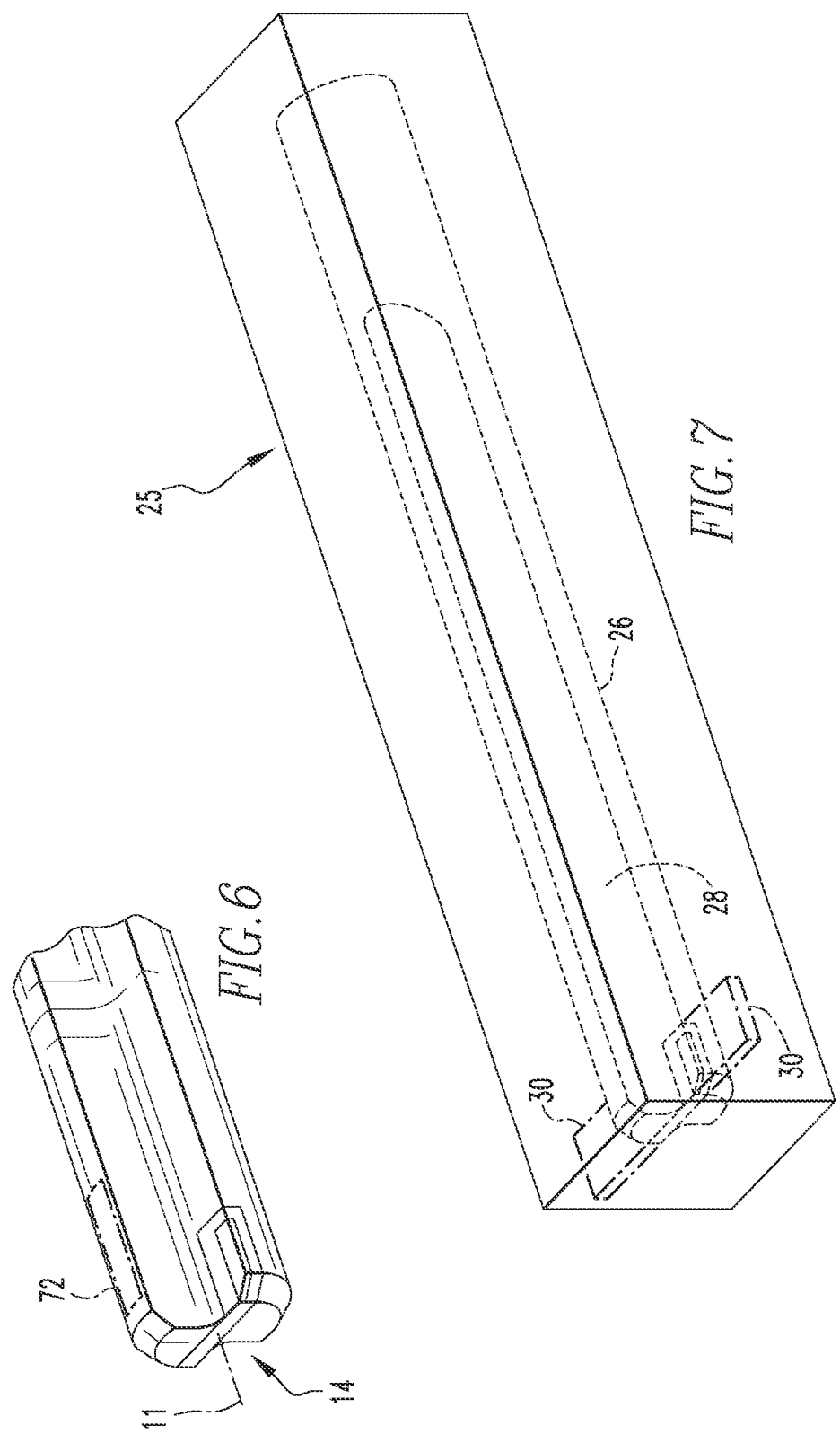

CUTTING TOOL HAVING AT LEAST PARTIALLY MOLDED BODY AND METHOD OF MAKING SAME

BACKGROUND

1. Field of the Invention

The invention relates generally to rotary cutting tools and, more particularly, to cutting tools having a generally cylindrical body, at least a portion of which is formed via a molding process. The invention further relates to a method for making such cutting tools.

2. Background Information

Rotary cutting tools, such as, for example, without limitation, drills, reamers, or endmills are commonly formed wholly from hardened tool steels, from hardened tool steels coated with a secondary, hardened material, or formed from hardened tool steels provided with replaceable cutting inserts formed from other hardened materials such as, for example, polycrystalline diamond (PCD), polycrystalline cubic boron nitride (PCBN), ceramic, cemented carbide, and cermet. While such hardened materials generally produce a desirable final product, the costs associated with producing such final product are generally undesirable as the hardened materials typically require a large amount of time and machining in order to produce a finished product.

Although known rotary cutting tools have been generally suitable in many applications, there still exists room for improvement. For example, when a drill made from a single piece of carbide has been used to a point where the cutting edges have become dull, the drill must either be disposed of or reconditioned. In most cases, it is only the cutting edges that are worn and not the rest of the cutting tool body. Disposal of the cutting tool obviously results in no further use of the tool. Reconditioning on the other hand, provides for further use of the tool, but such further use is often more limited than the original use and is accompanied by a generally large reconditioning cost.

There is, therefore, a need for improved cutting tools.

SUMMARY OF THE INVENTION

Deficiencies in the prior art are addressed by embodiments of the invention which are directed to an improved cutting tool and a method of making the same.

As one aspect of the invention, a cutting tool for performing cutting operations on a workpiece when the cutting tool is rotated about a central axis by a machine tool is provided. The cutting tool comprises: a generally cylindrical body disposed about the central axis, the generally cylindrical body having a first end and an opposite second end; a cutting element disposed at or about the first end of the generally cylindrical body, the cutting element having a number of cutting edges structured to engage the workpiece during cutting operations; and a mounting portion disposed at or about the opposite second end of the generally cylindrical body, the mounting portion being structured to be coupled to the machine tool. At least a portion of the generally cylindrical body comprises a molded portion formed via a molding process. The molded portion is formed about the cutting portion in a manner that couples the cutting element to the generally cylindrical body.

The molded portion may be formed from fibers or particles disposed randomly or in a predetermined ply structure disposed among/within a matrix material.

The cylindrical body portion may comprise a pre-formed inner core portion disposed at or about the central axis and the molded portion may be formed about the inner core portion. The inner core portion may comprise one of a hollow tubular member or a solid cylindrical member. The inner core portion may be formed from one of steel, carbide, fiber-reinforced composite, or particle-reinforced composite.

The molded portion may comprise a number of wear resistant elements disposed or formed therein. The wear resistant elements may be formed from at least one of PCD, PCBN, carbide, cermet or ceramic.

The cylindrical body portion may include a number of chip evacuation flutes and the molded portion may comprise a number of wear resistant and/or thermal resistant particles disposed at or about the number of flutes.

The molded portion may comprise a number of wear resistant metal layers and/or shims disposed at or about the mounting portion.

The molded portion may comprise a number of cooling channels formed therein.

The cutting portion may comprise a number of plate members coupled to the cylindrical body via the molded portion and the number of cutting edges may be formed in a number of cutting members, such as cutting inserts, selectively coupled to the number of plate members.

As another aspect of the invention, a method of forming a cutting tool for use in rotary cutting operations is provided. The method comprises: providing a mold formed from one or more mold sections, the mold having a number of internal surfaces which define an interior space within the mold in the shape of the cutting tool; securing a cutting portion of the cutting tool within the mold; providing a quantity of settable material within the interior space of the mold and about a portion of the cutting portion to form a cutting tool within the mold; allowing the settable material to set; and removing the cutting tool from the mold.

The method may further comprise placing a core portion within the mold prior to providing the quantity of settable material within the mold and providing the quantity of settable material within the mold may comprise providing the settable material about the core portion.

The method may further comprise placing a number of tubular members in the mold prior to providing the quantity of settable material within the mold and providing the quantity of settable material within the mold may comprise providing the material about the number of tubular members.

The quantity of settable material may be provided via an injection process.

The quantity of settable material may be provided by drawing the settable material into the interior space of the mold via a vacuum process.

The method may further comprise providing a number of wear resistant elements within the settable material.

The method may comprise electroplating a portion of the set material after removing the cutting tool from the mold.

BRIEF DESCRIPTION OF THE DRAWINGS

A full understanding of the invention can be gained from the following description of the preferred embodiments when read in conjunction with the accompanying drawings in which:

FIG. 6 is an isometric view of a portion of a rotary cutting tool in accordance with a further example embodiment of the invention; and FIG. 7 is a schematic isometric view of a mold for forming a cutting tool in accordance with an example embodiment of the invention.

DESCRIPTION OF THE PREFERRED EMBODIMENTS

Figure 1:
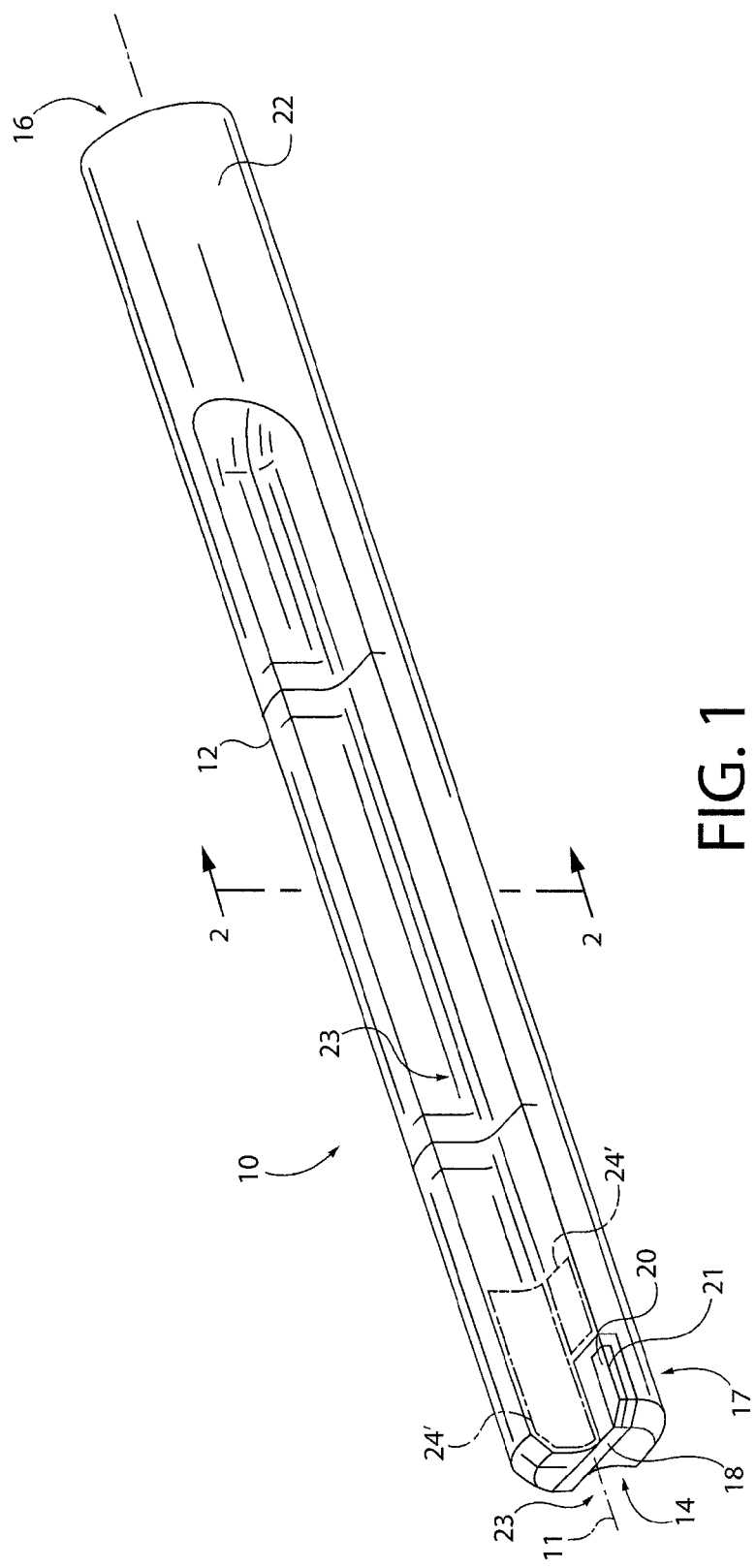
FIG. 1 is an isometric view of a rotary cutting tool in accordance with an example embodiment of the present invention.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As used herein, the term "number" shall be used to refer to any non-zero quantity (i.e. one or any quantity greater than one).

FIG. 1 depicts an example cutting tool in accordance with a non-limiting embodiment of the present invention, for conducting rotary cutting operations on a workpiece (not shown) when cutting tool 10 is rotated about a central longitudinal axis 11. Cutting tool 10 includes a generally cylindrical tool body 12 having a first end 14 and an opposite second end 16. Although cutting tool 10 is shown in the form of a reamer, it is to be appreciated that the concepts described herein may also be applied to other rotary cutting tools such as, for example, without limitation, drills (e.g., single fluted, multi-fluted, helical, straight), modular drills, step drills, end mills, face mills, grooving tools, turning tools, boring bars, routers, taps, and circular saws.

Continuing to refer to FIG. 1, cutting tool 10 includes a cutting element 17 disposed generally at or about the first end 14 which is structured to engage, and perform cutting operations on, a workpiece (not shown) when the cutting tool 10 is rotated about the central longitudinal axis 11. The cutting element 17 has a number of cutting edges 21 structured to engage the workpiece during cutting operations. In the illustrated embodiment, cutting element 17 includes a plate member 18 disposed generally transverse to axis 11 having a number (two in the illustrated embodiment) of cutting members 20 formed as a portion of, or coupled thereto (either permanently or selectively) and defining a number of cutting edges 21. As cutting tool 10 is depicted as a reamer in the embodiment illustrated in FIG. 1, the cutting members 20 comprise two reaming inserts, each selectively coupled to the plate member 18 such that each insert may be selectively removed and replaced as needed due to wear and tear from use. Such selective coupling may be accomplished through various means as commonly employed in the art for coupling a removable insert to a cutting tool.

Continuing to refer to FIG. 1, cutting tool 10 further includes a mounting portion 22 disposed generally at or about the second end 16 that is adapted to be mounted in a chuck or other similar portion of a machine tool for rotating the cutting tool 10 about axis 11. One or more flutes 23 which extend from the cutting element 17 toward mounting portion 22 may be provided in tool body 12 to assist in evacuating chips formed during cutting operations. Although shown having straight flutes in the example embodiment depicted, it is to be appreciated that the flutes provided in the tool body 12 may also be helical, of various quantity, or other suitable arrangement without varying from the scope of the present invention. It is to be appreciated that cutting tool 10 may include any or all of the features previously described as well as other features of known cutting tools not particularly identified herein without varying from the scope of the present invention.

Figure 2:
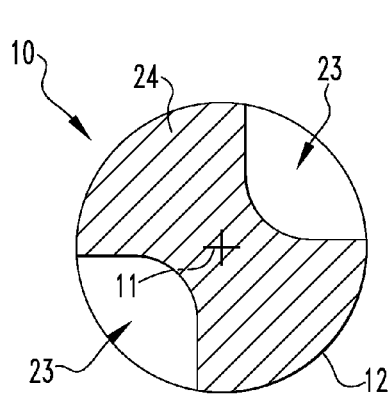
FIG. 2 is a cross-sectional view of the rotary cutting tool of FIG. 1 taken along line 2-2.

Cutting tool 10 differs from known cutting tools in that all, or at least a portion, of cylindrical body 12 is formed in a finished or semi-finished state from a molding process. As shown in the cross-sectional view of FIG. 2, the entire tool body 12 of cutting tool 10 is formed as a molded portion 24 formed via a molding process. Such molding process is carried out using a mold, such as mold 25 depicted schematically in FIG. 7. Mold 25 includes a number of internal surfaces 26 which define an interior space 28 in the form of the outer shape of the cutting tool 10. Mold 25 is preferably formed from a suitable rigid, or semi-rigid material such as generally used for forming molds and may be formed from, or include, a number of sections (not numbered) which may be coupled together to form the mold 25 and then subsequently uncoupled in order to facilitate removal of a formed cutting tool 10. Mold 24 includes one or more coupling mechanisms 30 for fixing cutting element 17 for cutting tool 10 in a precise location within the interior space 28. Although shown only schematically in FIG. 7, such coupling mechanism(s) may include clamps, screw-type precision locators, glue, or pins.

Preferably, molded portion 24 is thrilled from a composite material. For example, molded portion 24 may be formed from fibers or particles disposed randomly or in a predetermined ply structure disposed among/within a settable matrix material. Such settable matrix material may be pre-impregnated with the fibers and later set during further processing or preferably is provided into the mold 25 via an injection or vacuum process and then allowed to set. Examples of suitable materials from which molded portion 24 may be formed include, without limitation, reinforced plastics, carbon fiber composites, metal matrix composites, and metal alloys.

Additionally, all, or selected portions of, molded portion 24 may be formed from selected materials that are particularly resistant to high temperatures or wear. For example, areas near the cutting element 17 are commonly subjected to high heat from cutting operations along with abrasive chips. Likewise, the chip evacuation portions of tool body 12 (e.g., flutes 23), are also commonly subjected to such conditions. Portions 24' of molded portion 24 of FIG. 1 show some non-limiting examples of such areas that are desirably formed from temperature/wear resistant materials.

Figure 3:
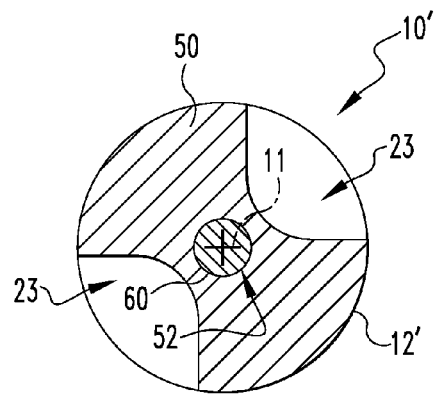
FIG. 3 is a cross-sectional view of a rotary cutting tool in accordance with another example embodiment of the present invention.
Figure 4:
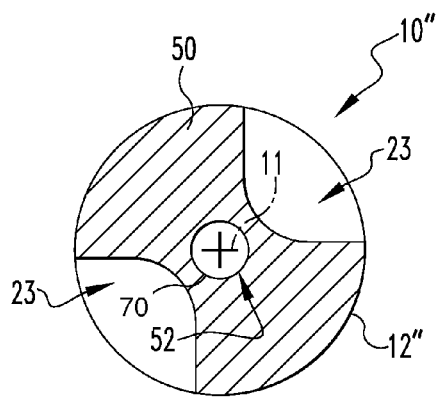
FIG. 4 is a cross-sectional view of a rotary cutting tool in accordance with yet another example embodiment of the present invention.

FIGS. 3 and 4 show cross-sectional views of example cutting tools 10' and 10" in accordance with other embodiments of the present invention which incorporate similar features as cutting tool 10 (e.g., without limitation, flutes 23) but are formed in a slightly different manner. More particularly, cutting tools 10' and 10" show example embodiments in which a tool body 12' and 12" is formed from a molded portion 50 formed about a preformed central core 52. In such examples, molded portion 50 is generally formed as previously discussed. As shown in the example embodiment of FIG. 3, the core 52 may be formed from a solid, cylindrical member 60. As shown in the example embodiment of FIG. 4, the core 52 may also be formed from a hollow tubular member 70. In either case, core 52 is preferably formed from steel, carbide, fiber-reinforced composite, particle-reinforced composite, or other suitable material. The core 52 may be initially provided in an unstressed state or alternately may be pre-stressed prior to formation of molded portion 50 thereabout. For example, the core 52 may be initially placed into a mold, such as mold 25, in a radially stressed condition (i.e., twisted) prior to having molded portion 50 formed thereabout. Such pre-stressing of core 52 may be used to modify bending and torsional behavior.

Hollow tubular member 70 may be utilized as a coolant passage for providing a flow of coolant through tool body 12" generally to the cutting portion of the cutting tool 10", which includes cutting element 17. Alternately, in certain applications tubular member 70 may be used to provide a means for internal chip evacuation from the cutting area adjacent the cutting portion of the cutting tool 10".

In order to increase durability and overall performance of the cutting tool 10, one or more wear resistant elements are disposed or formed therein. Such wear resistant elements may be formed, for example, without limitation, from one or more of PCD (polycrystalline diamond), PCBN (Polycrystalline Cubic Boron Nitride), carbide, cermet, ceramic or other suitable material. For example, wear and/or thermal resistant particles may be incorporated into the molded portion adjacent the flutes in order to help protect the flutes from detonating due to contact with hot and abrasive chips formed during cutting operations, such as previously discussed in regard to portion 24' of FIG. 1. Similarly, the portions of molded material at or about the flutes may be coated via an electroplating process after the cutting tool has been formed in, and subsequently removed from mold 25, in order to provide extra protection to such areas.

Figure 5:
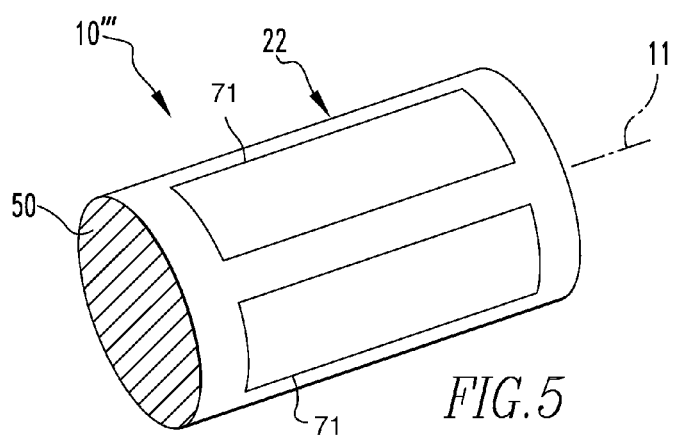
FIG. 5 is an isometric view of a portion of a rotary cutting tool in accordance with an example embodiment of the invention.

As another example, such as shown in FIG. 5, the molded portion may include a number of wear resistant metal layers and/or shims 71 disposed at or about the mounting portion 22 of cutting tool 10''' to increase the strength/wear resistance of the cutting tool at or about where it would be mounted in a machine tool (not shown).

As yet another example, such as shown in FIG. 6, the molded portion may include a number of wear resistant portions 72 molded therein at or about the leading end (i.e., first end 14) of the cutting tool which serve as guide pads for the cutting tool. Accordingly, portions 72 would typically slightly extend outward from tool body 12.

In addition to wear resistant elements, other beneficial elements may be readily incorporated into the molded portion of the cutting tool body. As an example, rigid or semi-rigid tubular members may be provided in mold 25 such that the molded portion would be formed generally thereabout. Once such molded portion is formed and the cutting tool is removed from the mold, such tubular members may be employed as cooling channels for use in helping to reduce temperatures in one or both of the tool body or cutting portion during cutting operations.

While specific embodiments of the invention have been described in detail herein, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of forming a cutting tool for use in rotary cutting operations, the method comprising:

providing a mold formed from one or more mold sections, the mold having a number of internal surfaces which define an interior space within the mold in the shape of the cutting tool;

disposing and securing a cutting element within the interior space of the mold, the cutting element comprising at least one portion being pre-formed from a first material;

the cutting portion element comprising a plate member;

providing a quantity of settable material, different from the first material, within the interior space of the mold and about a portion of the cutting element to form a cutting tool within the mold;

allowing the settable material to set; and removing the cutting tool from the interior space of the mold; and providing the cutting element with a number of cutting edges structured to perform cutting operations on a workpiece;

wherein the plate member is disposed generally transverse to a central longitudinal axis of the cutting tool, and extends across a width of the cutting tool; and wherein the cutting element further comprises one or more inserts positioned on the plate.

2. The method of claim 1 further comprising placing a preformed core portion within the mold prior to providing the quantity of settable material within the mold, and wherein providing the quantity of settable material within the mold comprises providing the settable material about the core portion.

3. The method of claim 1 further comprising placing a number of tubular members in the mold prior to providing the quantity of settable material within the mold, and wherein providing the quantity of settable material within the mold comprises providing the material about the number of tubular members.

4. The method of claim 1 wherein the quantity of settable material is provided via an injection process.

5. The method of claim 1 wherein the quantity of settable material is provided by drawing the settable material into the interior space of the mold via a vacuum process.

6. The method of claim 1 further comprising providing a number of wear resistant elements within the settable material.

7. The method of claim 1 further comprising electroplating a portion of the set material after removing the cutting tool from the mold.

8. A cutting tool for performing cutting operations on a workpiece formed in accordance with the method of claim 1.

9. The method of claim 1, wherein the first material comprises polycrystalline diamond.

10. The method of claim 1, wherein the first material comprises polycrystalline cubic boron nitride.

11. The method of claim 1, wherein the first material comprises cermet or ceramic.

12. The method of claim 2, wherein the core portion is formed of steel, carbide, fiber-reinforced composite or particle-reinforced composite.

13. The method of claim 2, wherein the core portion is in a stressed condition prior to providing the quantity of settable material within the mold.

14. The method of claim 13, wherein the core portion is in a radially stressed condition.

15. The method of claim 1, wherein the cutting edges are provided via one or more cutting inserts selectively coupled to the plate member.

16. The method of claim 12, wherein the core portion is formed of fiber-reinforced composite.

* * * * *